United States Patent
Dawkins et al.

(10) Patent No.: US 11,093,332 B2
(45) Date of Patent: Aug. 17, 2021

(54) APPLICATION CHECKPOINT AND RECOVERY SYSTEM

(71) Applicant: Dell Products L.P., Round Rock, TX (US)

(72) Inventors: William Price Dawkins, Lakeway, TX (US); Shyamkumar T. Iyer, Austin, TX (US); Kurtis John Bowman, Austin, TX (US); Jimmy Doyle Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 171 days.

(21) Appl. No.: 16/403,188

(22) Filed: May 3, 2019

(65) Prior Publication Data

US 2020/0349008 A1 Nov. 5, 2020

(51) Int. Cl.
*G06F 11/00* (2006.01)
*G06F 11/14* (2006.01)

(52) U.S. Cl.
CPC ...... *G06F 11/1407* (2013.01); *G06F 11/1435* (2013.01); *G06F 11/1458* (2013.01); *G06F 11/1471* (2013.01)

(58) Field of Classification Search
CPC ............. G06F 11/1407; G06F 11/1435; G06F 11/1458; G06F 11/1471; G06F 11/0793; G06F 11/1469
See application file for complete search history.

(56) References Cited

U.S. PATENT DOCUMENTS

| | | | | |
|---|---|---|---|---|
| 6,105,148 A * | 8/2000 | Chung | ............. | G06F 11/1438 714/16 |
| 8,332,689 B2 * | 12/2012 | Timashev | .......... | G06F 11/1469 714/15 |
| 8,745,442 B1 * | 6/2014 | Havemose | ......... | G06F 11/1469 714/15 |
| 2004/0153718 A1 | 8/2004 | Shen et al. | | |
| 2016/0019107 A1 * | 1/2016 | North | ................ | G06F 9/45558 714/19 |
| 2019/0196912 A1 * | 6/2019 | Didehban | .......... | G06F 11/1471 |

FOREIGN PATENT DOCUMENTS

JP 2011060055 3/2011

* cited by examiner

*Primary Examiner* — Joseph D Manoskey
(74) *Attorney, Agent, or Firm* — Haynes and Boone, LLP

(57) ABSTRACT

An application checkpoint and recovery system includes an application provided using application information from a first location in a memory fabric. A data mover device receives an application checkpoint instruction and performs application checkpoint operations including capturing a first version of the application information from the first location in the memory fabric, and providing the first version of the application information in a second location in the memory fabric. The data mover device may receive an application recovery instruction subsequent to the application modifying the first version of the application information to provide a second version of the application information in the first location of the memory fabric, and may transfer the first version of the application information from the second location in the memory fabric to the first location in the memory fabric so that it is available for use in providing the application.

20 Claims, 17 Drawing Sheets

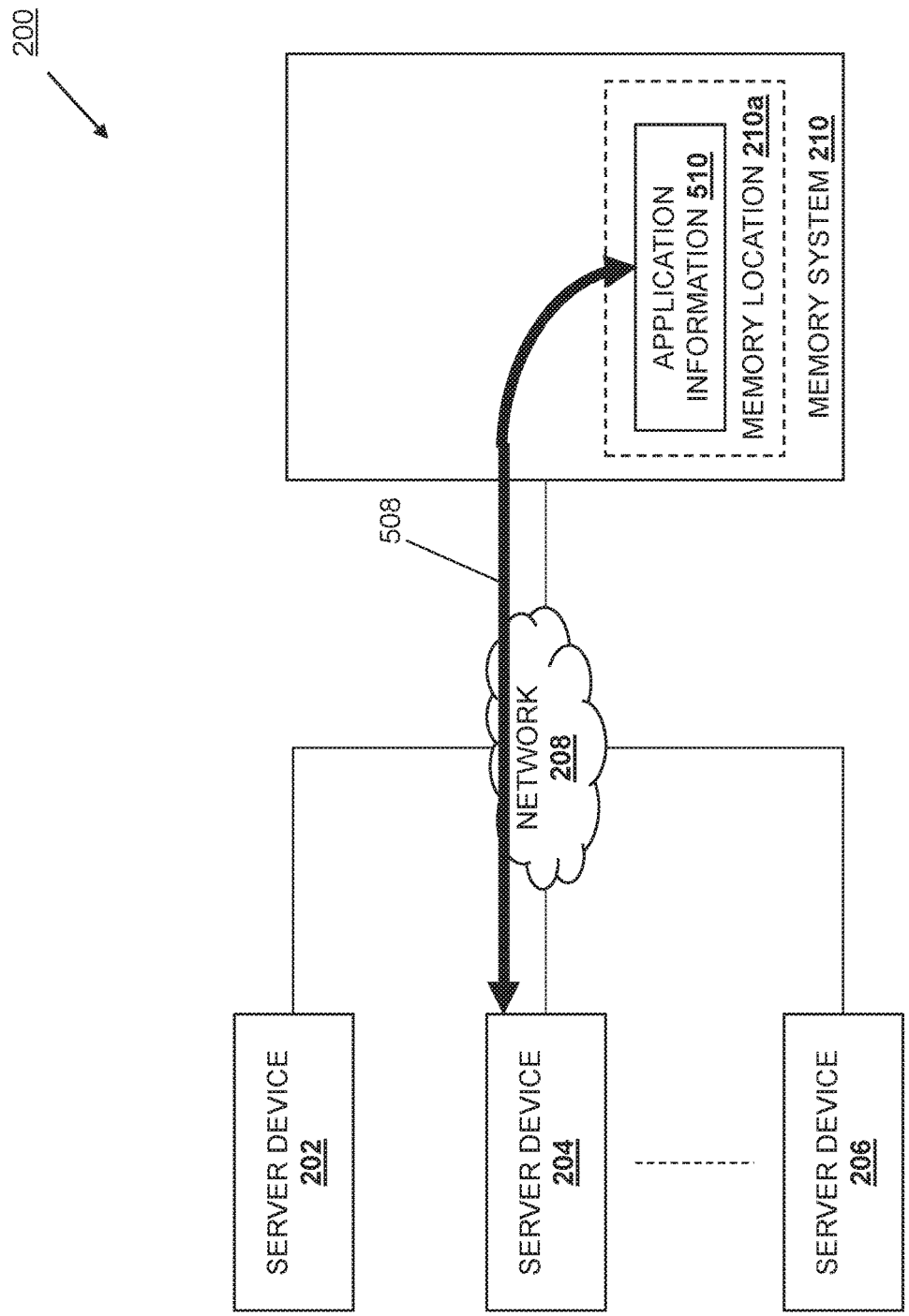

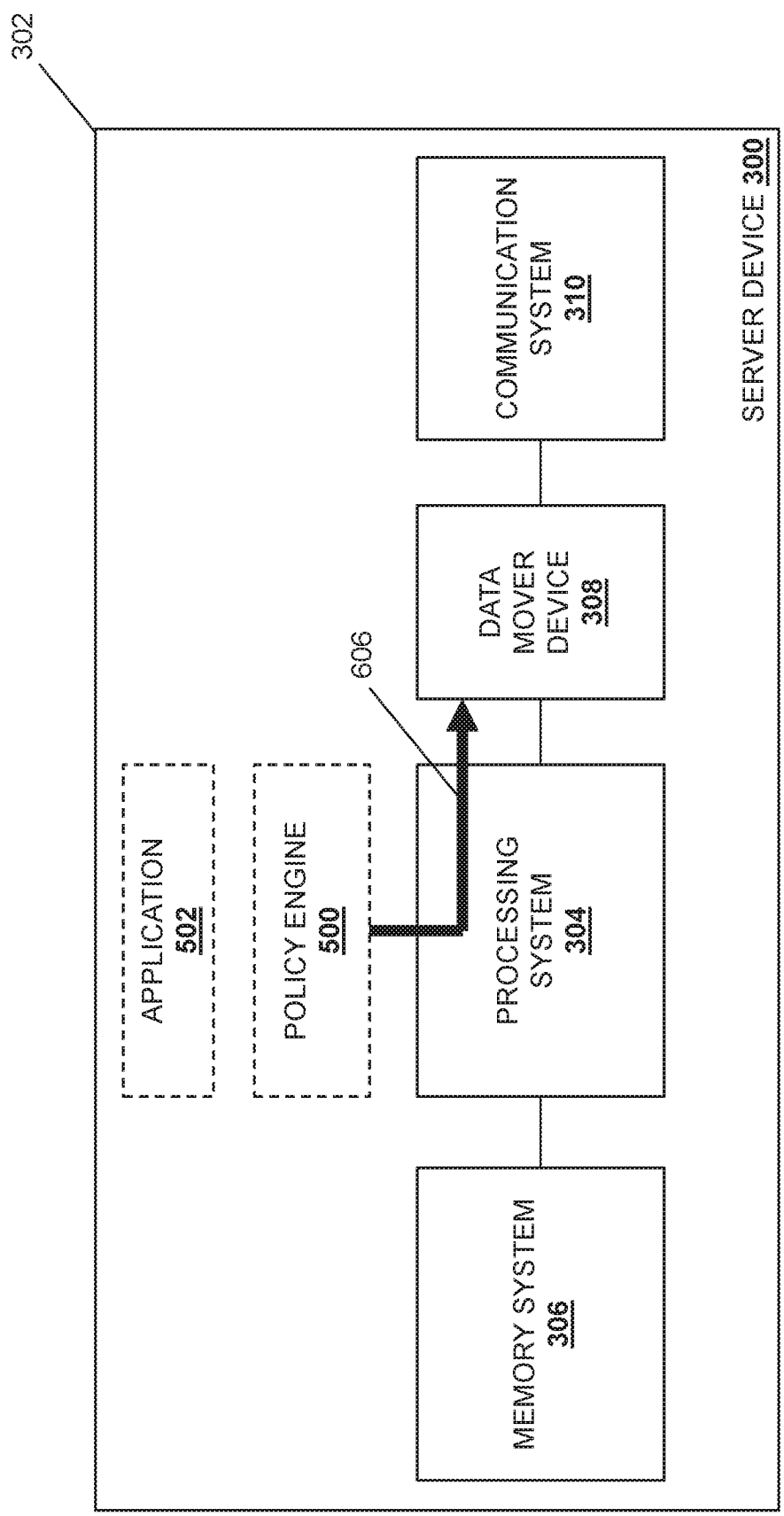

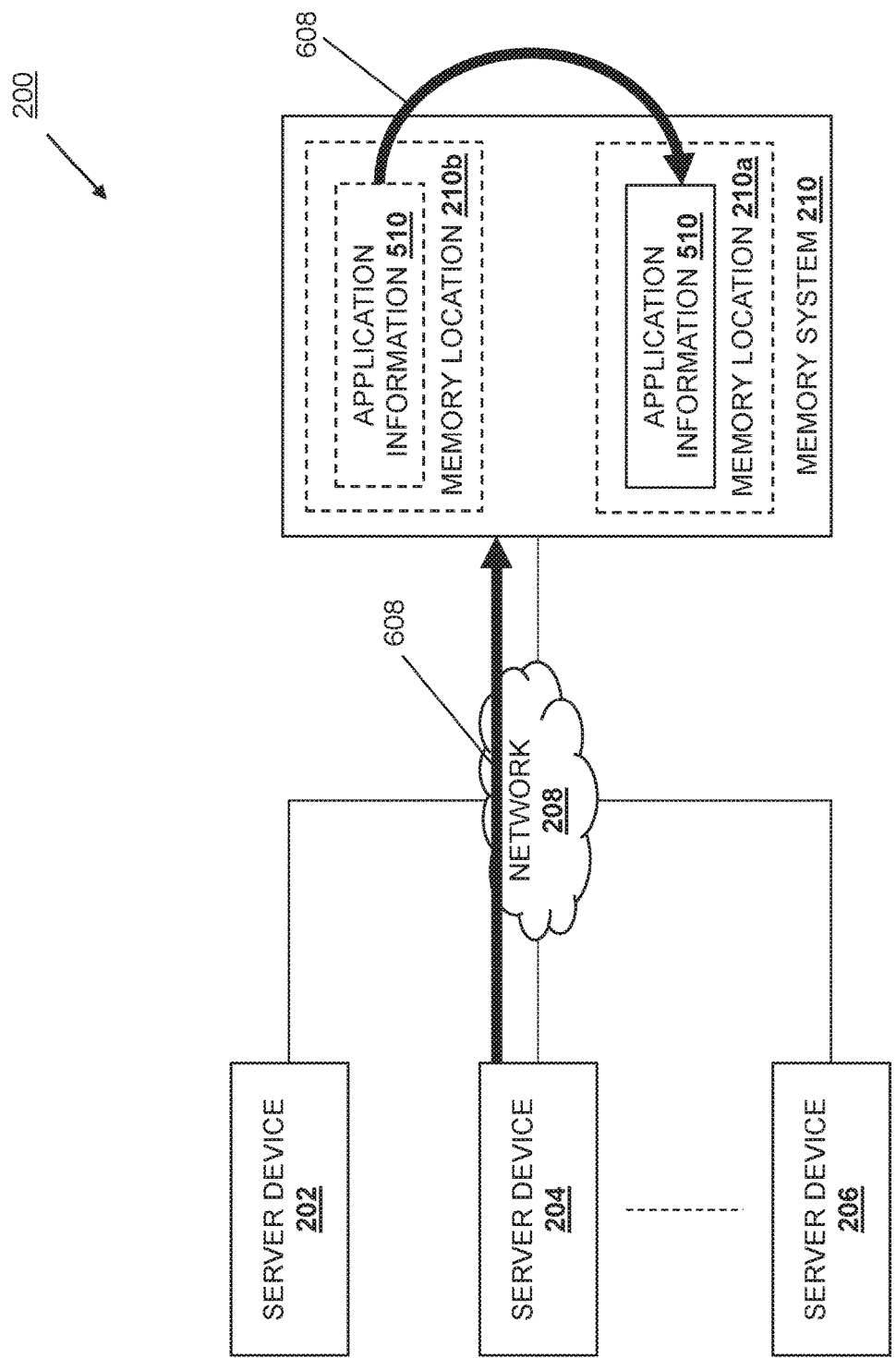

APPLICATION CHECKPOINT AND RECOVERY SYSTEM

BACKGROUND

The present disclosure relates generally to information handling systems, and more particularly to performing application checkpoint and recovery operations in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, often operate to provide applications and may utilize application checkpointing in order to provide fault tolerance for the application and/or server device. As would be understood by one of skill in the art in possession of the present disclosure, application checkpointing operates by saving an application snapshot of the state of an application, and allows recovery from an application/server device/service device component failure via the use of the application snapshot to restart the application from the point at which the application snapshot was saved, which may be particularly useful for long-running applications that execute in failure-prone server devices. Conventional application checkpointing systems utilize the processing system that is providing the application to freeze or stop operation of that application, and capture an application snapshot of the state of that application that may include processor process state information, application intermediate data, and in-flight Input/Output I/O data, and store that application snapshot to a local memory system (e.g., provided by Dynamic Random Access Memory (DRAM) devices). The conventional application checkpointing systems then utilize the processing system to copy that application snapshot from the local memory system to a persistent storage device (e.g., provided by a Hard Disk Drive (HDD)). As such, conventional application checkpointing systems require several copy operations by the processing system that utilize processing system cycles each time an application snapshot/checkpoint is needed, an issue which is exacerbated by applications and/or server devices that create repeated application snapshot/checkpoint versions for the applications.

Accordingly, it would be desirable to provide an improved application checkpointing system.

SUMMARY

According to one embodiment, an Information Handling System (IHS) includes a data mover processing system; and a data mover memory system that is coupled to the data mover processing system and that includes instructions that, when executed by the data mover processing system, cause the data mover processing system to provide a data mover engine that is configured to: receive an application checkpoint instruction generated by a policy engine and, in response, perform an application checkpoint operation that includes: capturing a first version of application information that is used by an application processing system to provide an application and that is stored in a first location in a memory fabric; and providing the first version of the application information for storage in a second location in the memory fabric; and receive subsequent to the application modifying the first version of the application information stored in the first location in the memory fabric to provide a second version of the application information stored in the first location of the memory fabric, an application recovery instruction generated by the policy engine and, in response, perform an application recovery operation that includes: transferring the first version of the application information from the second location in the memory fabric to the first location in the memory fabric such that the first version of the application information is available for use by the application processing system in providing the application.

BRIEF DESCRIPTION OF THE DRAWINGS

FIG. 5E is a schematic view illustrating an embodiment of the networked system of FIG. 2 operating during the method of FIG. 4.

FIG. 6D is a schematic view illustrating an embodiment of the application checkpoint and recovery system in the server device of FIG. 3 operating during the method of FIG. 4.

FIG. 6E is a schematic view illustrating an embodiment of the networked system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
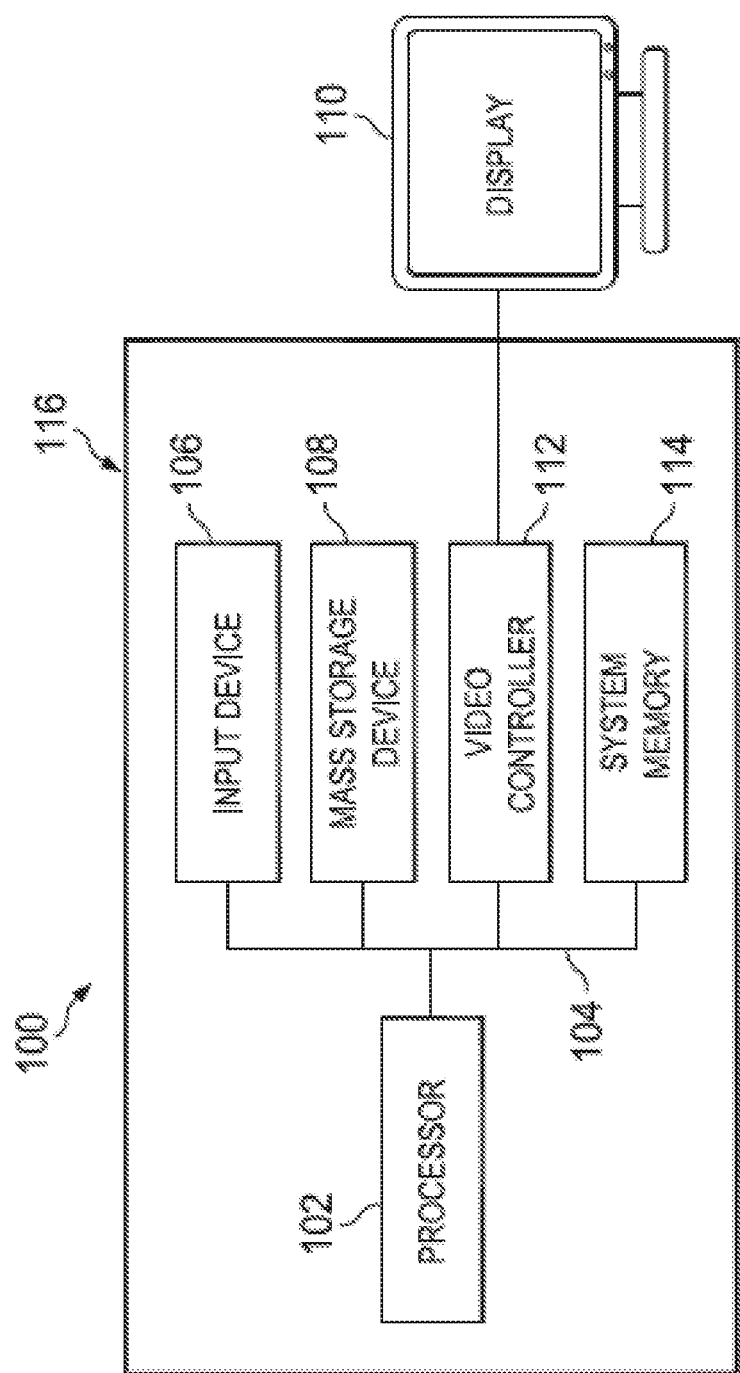
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
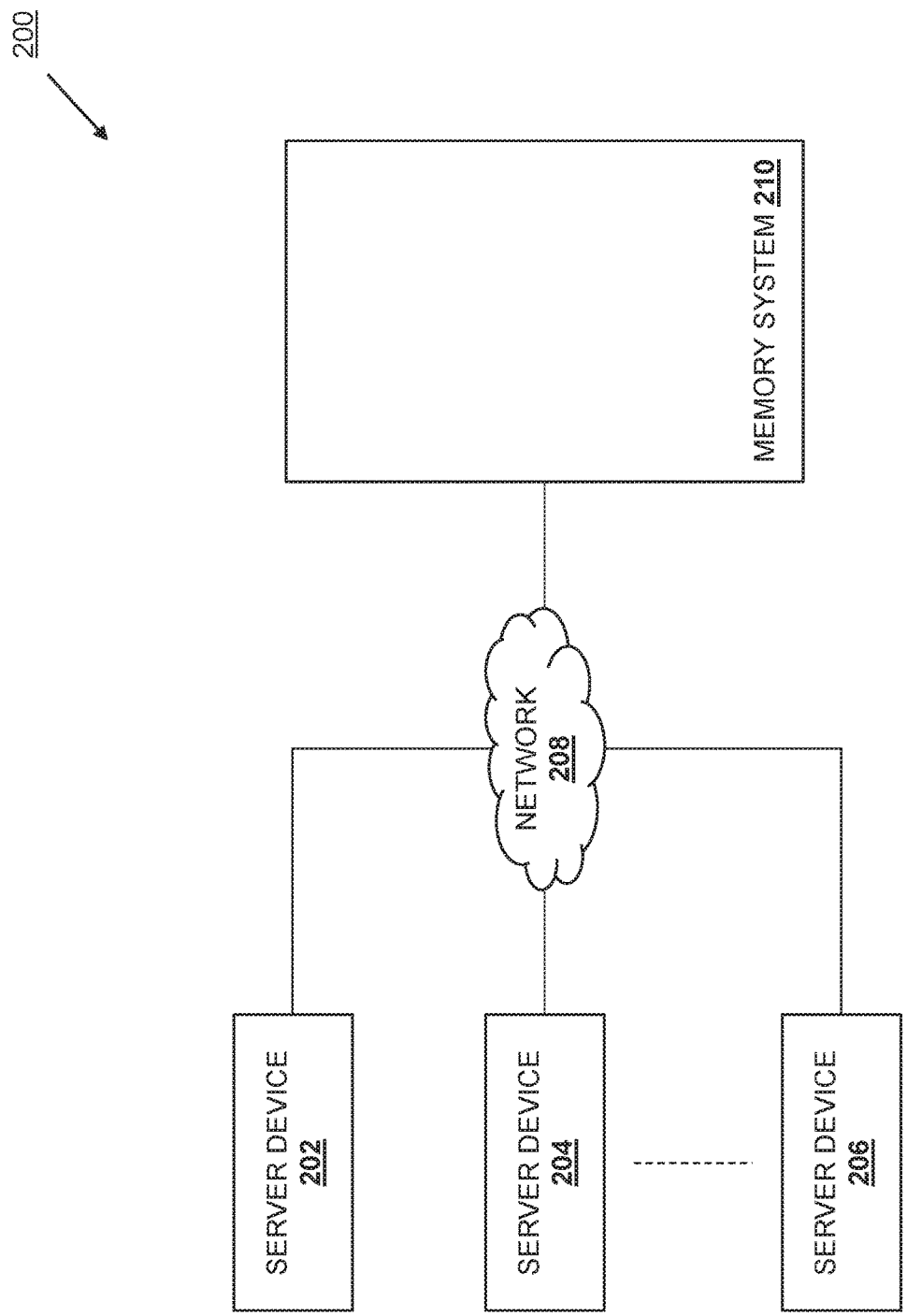
FIG. 2 is a schematic view illustrating an embodiment of a networked system.

Referring now to FIG. 2, an embodiment of a networked system 200 is illustrated. In the illustrated embodiment, the networked system 200 incudes a plurality of server devices 202, 204, and up to 206. In an embodiment, any or all of the server devices 202-206 may be provided by the IHS 100 discussed above with reference to FIG. 1, and/or may include some or all of the components of the IHS 100. However, while illustrated and discussed as a server devices, one of skill in the art in possession of the present disclosure will recognize that the server devices 202-206 provided in the networked system 200 may be provided by any devices that may be configured to operate similarly to the server devices discussed below. While only three server devices 202-206 are illustrated and discussed below, one of skill in the art in possession of the present disclosure will recognize that many more server devices may (and typically will) be provided in the networked system 200 (e.g., a datacenter) while remaining within the scope of the present disclosure.

In the Illustrated embodiment, the server devices 202-206 are coupled to a network 208 that is included in the networked system 200 and that may be provided by, for example, a Local Area Network (LAN), the Internet, and/or any other network (or combination of networks) that would be apparent to one of skill in the art in possession of the present disclosure. Furthermore, the illustrated embodiment of the networked system 200 includes a memory system 210 that is coupled to the server devices 202-206 via the network 208. In an embodiment, the memory system 210 may be provided by the IHS 100 discussed above with reference to FIG. 1, and/or may include some or all of the components of the IHS 100. In specific examples, the memory system 210 may be provided by one or more separate server devices, as a logical portion of one or more of the server devices 202, 204, and 206, and/or in a variety of other manners that would be apparent to one of skill in the art in possession of the present disclosure. In the embodiments discussed below, the memory system 210 provides a network-connected memory fabric that may be utilized by the server device 202 via the network 204.

For example, the network-connected memory fabric may be a Gen-Z memory fabric created and commercialized by the Gen-Z consortium, and one of skill in the art in possession of the present disclosure will recognize that Gen-Z memory fabrics extend the processing system/memory system byte-addressable load/store model to the entire networked system 200 by decoupling the processing system/compute functionality in the server devices 202-206 from the memory system/media functionality in the memory system 210, allowing processing systems and memory system to act as peers that communicate using the same language and via simplified, high performance, low latency communication paths that do not incur the translation penalties and software overhead associated with conventional systems, thus eliminating bottlenecks and increasing efficiency via the unification of communication paths and simplification of software required for processing system/memory system communications. As such, in specific examples the network 208 may include Gen-Z switch device(s) and/or Gen-Z bridge device(s) that are configured to provide the server devices 202-206 access to the memory system 210/Gen-Z memory fabric. However, one of skill in the art in possession of the present disclosure will recognize that other types of memory fabrics will fall within the scope of the present disclosure as well. Furthermore, while the server devices 202-206 are illustrated as coupled to the memory system 210 via the network 208, one of skill in the art in possession of the present disclosure will recognize that in other embodiments the memory system 210 (or at least a portion of the memory system 210) may be provided in the server devices 202-206 while still enabling the functionality described below and remaining within the scope of the present disclosure as well. As such, while a specific networked system 200 has been illustrated and described, one of skill in the art in possession of the present disclosure will recognize that the application checkpoint and recovery system of the present disclosure may utilize a variety of other components and component configurations while remaining within the scope of the present disclosure as well.

Figure 3:
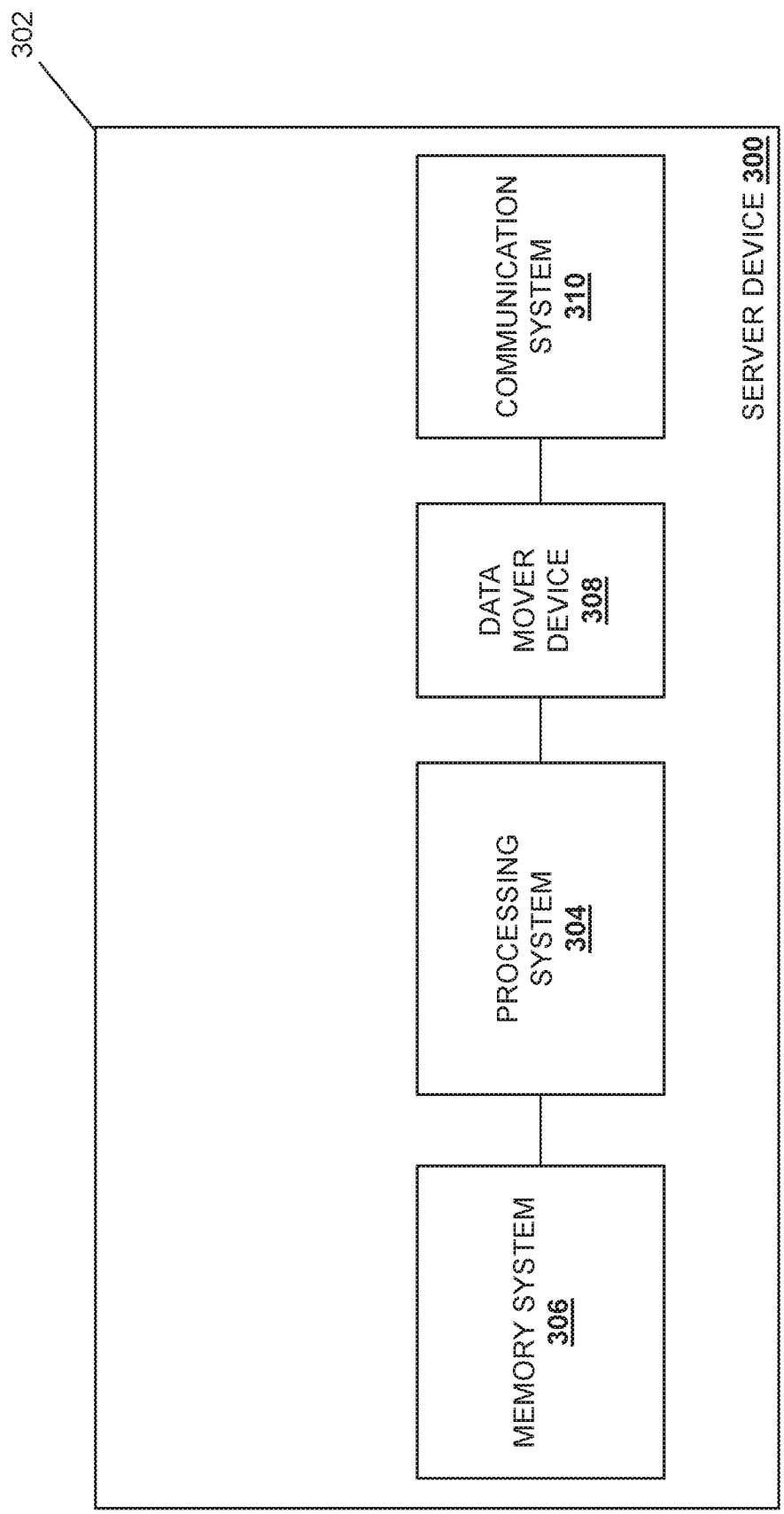
FIG. 3 is a schematic view illustrating an embodiment of a server device that may be included in the networked system of FIG. 2 and that may provide the application checkpoint and recovery system of the present disclosure.

Referring now to FIG. 3, an embodiment of a server device 300 is illustrated that may provide any of the server devices 202-206 discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly to the server devices discussed below. In the illustrated embodiment, the server device 300 includes a chassis 302 that houses the components of the server device 300, only some of which are discussed below.

For example and as illustrated in FIG. 3, the chassis 302 may house a processing system 304, with the processing system 304 coupled to memory system 306. In different embodiments, the processing subsystem 304 may include multiple processing subsystems (e.g., cores in a single processor or Central Processing Unit (CPU)), or may be one of a plurality of different processing systems in the server device 300 (e.g., in multi-processor systems), and/or combinations thereof. Similarly, in different embodiments, the memory subsystem 306 may be part of a single memory system, provided by different memory systems, and/or combinations thereof. However, while a particular example of a processing system/local memory system configuration is illustrated and described, one of skill in the art in possession of the present disclosure will recognize that a wide variety of processing system/local memory system configurations will benefit from the teachings of the present disclosure as thus will fall within its scope as well.

In some embodiments, the chassis 302 may house a data mover processing system (not illustrated, but which may include the processor 102 discussed above with reference to FIG. 1) and a data mover memory system (not illustrated, but which may include the memory 114 discussed above with reference to FIG. 1) that is coupled to the data mover processing system and that includes instructions that, when executed by the data mover processing system, cause the data mover processing system to provide a data mover device 308 that is configured to perform the functionality of the data mover engines and/or data mover devices discussed below. In the illustrated embodiment, the data mover device 308 is illustrated as separate from the processing system 304 and, as such, may be provided by separate data mover hardware and software (e.g., a Field Programmable Gate Array (FPGA) provided on a Peripheral Component Interconnect express (PCIe) card, and/or other subsystem known in the art) that is coupled to the processing system 304. However, in other embodiments, the data mover device 308 may be integrated with, included in, and/or otherwise part of the processing system 304. As such, in those embodiments, the data mover device 308 may be provided by instructions on a local memory system (e.g., the memory system 306) in the server device 300 that is utilized by a CPU-independent portion of the processing system 304, provided as an FPGA that is part of the processing system 304, and/or provided in a variety of manners that would be apparent to one of skill in the art in possession of the present disclosure. In some examples, the data mover device 308 may appear to the processing system 304 (e.g., a CPU) as a separate, connected PCIe device (regardless of whether that data mover device 308 is provided separately from or as part of that processing subsystem 304). In specific examples, the data mover device 308 may be provided by an architectural data mover that is configured to perform read, write, copy, and/or other data movement operations for the processing system 304 in order to, for example, relieve the processing system 304 from having to use processing cycles to perform those operations.

In the illustrated embodiment, the chassis 302 houses a communication subsystem 310 that may include a Network Interface Controller (NIC), wireless communication subsystems (e.g., BLUETOOTH®, Near Field Communication (NFC), WiFi, etc.), and/or other communication components that would be apparent to one of skill in the art in possession of the present disclosure. Furthermore, in embodiments of the present disclosure that utilize a memory fabric, the communication system 310 may be configured to provide memory fabric management operations for the server device 300. For example, when the memory fabric is a Gen-Z memory fabric as discussed above, the communication system 310 may include a Gen-Z Memory Management Unit (Gen-Z ZMMU) that, in the example provided below, operates as a Gen-Z ZMMU requester that provides access for the processing system 304 to the Gen-Z memory fabric (e.g., in cooperation with a Gen-Z ZMMU responder in the memory system 210). However, one of skill in the art in possession of the present disclosure will recognize that other memory fabric management subsystems for other memory fabrics may be utilized with the teachings of the present disclosure while remaining within its scope as well. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
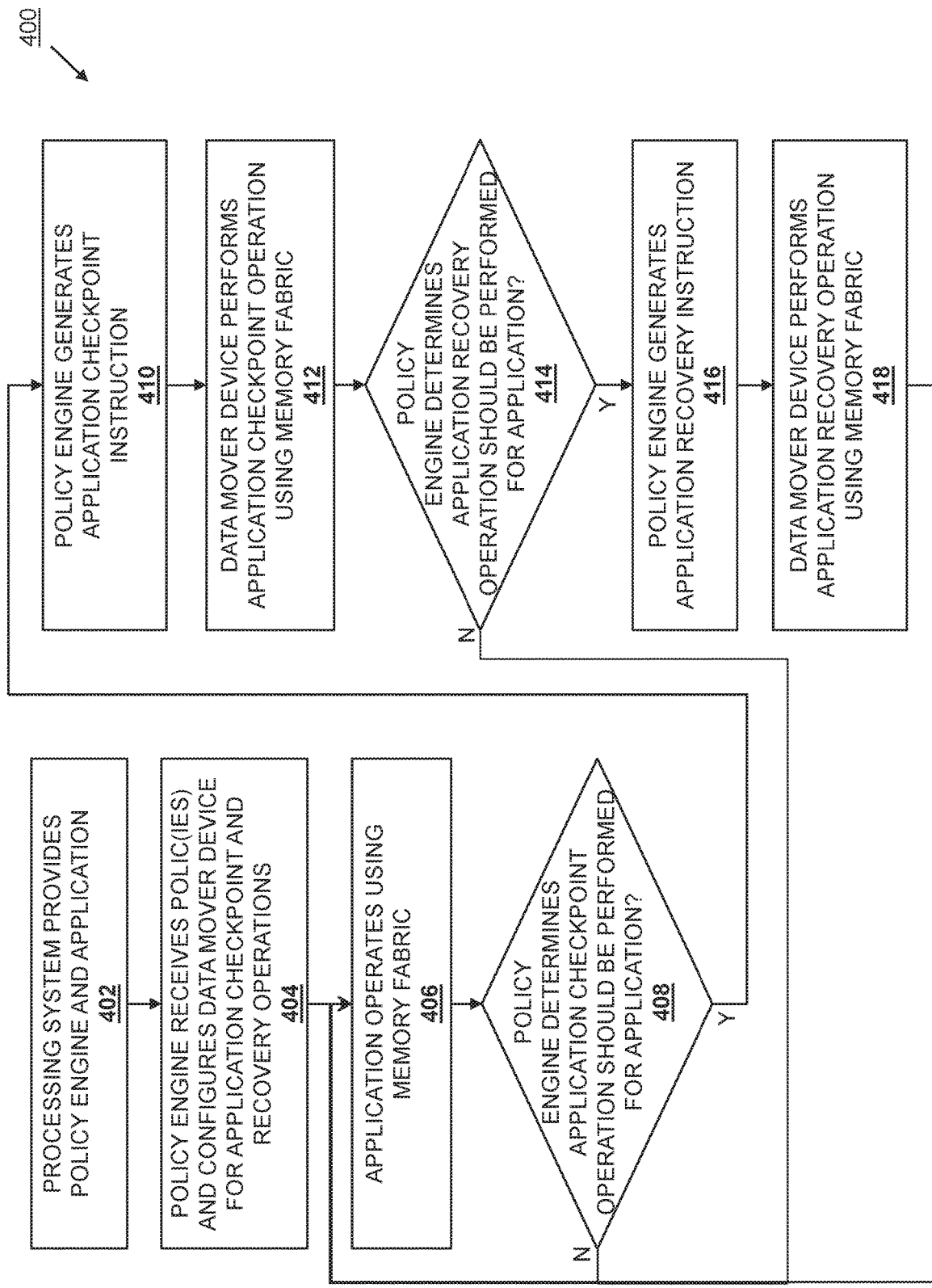
FIG. 4 is a flow chart illustrating an embodiment of a method for checkpointing and recovering applications.

Referring now to FIG. 4, an embodiment of a method for checkpointing and recovering applications is illustrated. As discussed below, the systems and methods of the present disclosure provide a policy engine such that is configured to cause a data mover device to perform application checkpoint operations that include capturing a first version of application information that is stored in a first location in a memory fabric and that is used to provide an application, and provide that first version of the application information for storage in a second location in the memory fabric. As the application operates, it may modify the application information stored in the first location in the memory fabric in order to produce second application information that is stored in the first location in the memory fabric, and the policy engine may cause the data mover device to perform application checkpoint operations at any time to ensure that a most current version of the application information (the first application information in this example) is also stored in a second location in a memory fabric. In the event of a failure associated with the application (e.g., a failure of the application during its operation, a corruption of the application information currently stored in the first location in the memory fabric, etc.), the policy engine may cause the data mover device to perform application recovery operations that include transferring the first application information from the second location in the memory fabric to the first location in the memory fabric so that it may be used to restart/recover the application at the point at which the first application information was captured and stored in the second location in the memory fabric. As such, an application checkpoint and recovery system is provide that offloads the application checkpoint and recovery operations from the processing system to a data mover device, while storing current application information used to provide the application, as well as a prior version of the application information that may be used to recover that application, in a memory fabric.

Figure 5A:
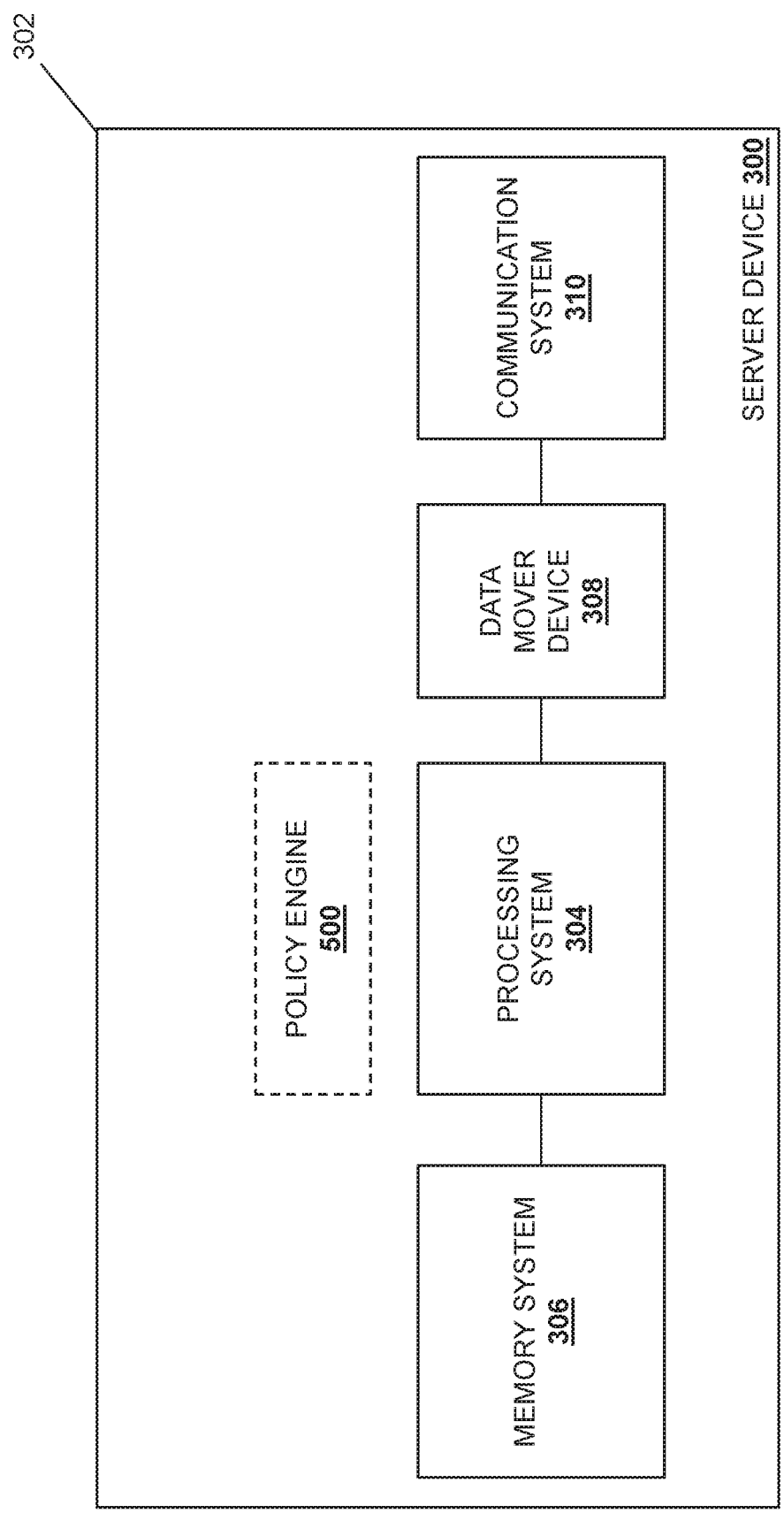
FIG. 5A is a schematic view illustrating an embodiment of the application checkpoint and recovery system in the server device of FIG. 3 operating during the method of FIG. 4.

The method 400 begins at block 402 where a processing system provides a policy engine and an application. As illustrated in FIG. 5A, in an embodiment of block 402, the processing system 304 in the server device 204 may operate to provide a policy engine 500. For example, the processing system 304 may execute instructions stored on the memory system 306 in order to provide the policy engine 500, although other methods for providing policy engines that function as described below will fall within the scope of the present disclosure as well. In a specific example, the policy engine 500 may be included as part of a kernel (e.g., an operating system kernel) provided by the processing system 304 and, as such, may operate as part of the core of an operating system provided for the server device 204/300 that is one of the first programs loaded upon initialization of the server device 204/300, that has control over any of the subsystems in the server device 204/300 and performs operations such as completing initialization operations for the server device 204/300, handling input/output requests from software/applications provided on the server device 204/300, translates input/output requests into data processing instructions for the processing system 304, handles memory subsystems and peripheral devices, and/or performs a variety of other kernel operations that would be apparent to one of skill in the art in possession of the present disclosure. However, while described as being provided in a kernel subsystem, the policy engine 500 may be provided in a hypervisor subsystem and/or other subsystems that one of skill in the art in possession of the present disclosure would recognize as having privilege levels that allow it to access the components of the server device 204/300 in the manner discussed below.

Figure 5B:
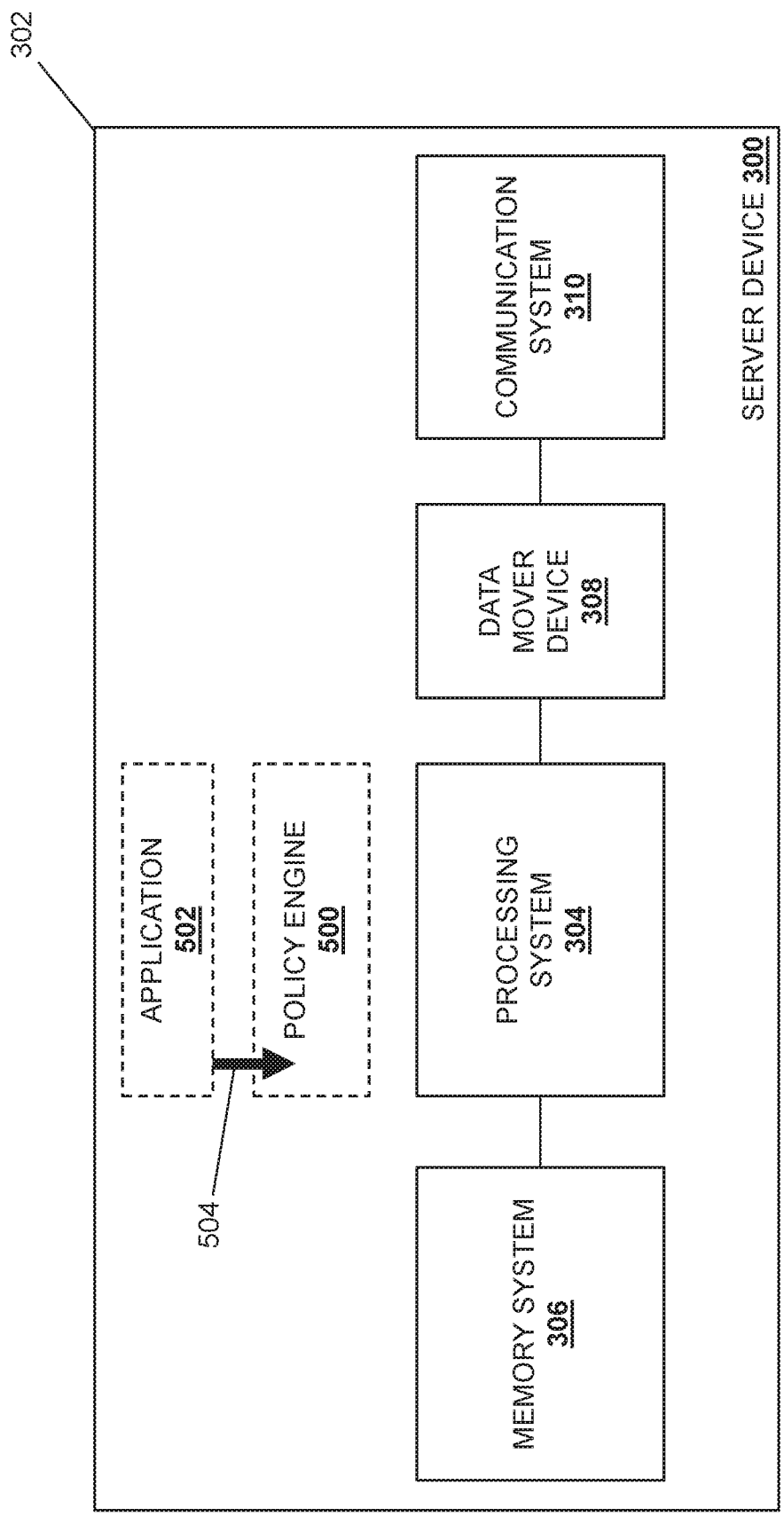
FIG. 5B is a schematic view illustrating an embodiment of the application checkpoint and recovery system in the server device of FIG. 3 operating during the method of FIG. 4.

As illustrated in FIG. 5B, in an embodiment of block 402, the processing system 304 in the server device 204 may also operate to provide an application 502. As discussed below, the processing system 304 may utilize application information stored on a memory fabric (e.g., provided by the memory system 210, the memory system 306, and/or any other memory that is accessible to the processing system 304 and part of the memory fabric) in order to provide the application 502. In some examples, the processing system 304 may utilize that application information directly from the memory fabric to provide the application, while in other examples, subsystems may be provided that synchronize that application information between the memory system 306 and/or processing system 304 (e.g., processor registers) and the memory fabric. While a few specific examples have been provided, one of skill in the art in possession of the present disclosure will recognize that the application 502 may be provided in a variety of manners that will fall within the scope of the present disclosure as well. In particular, the application 502 may be provided as a separate subsystem in the server device 204/300 from the policy engine 500 and/or the subsystem that provides that policy engine 500 (e.g., the kernel subsystem or hypervisor subsystem discussed above). While the example of the method 400 provided herein focuses on the operations and functioning of server device 204/300, one of skill in the art in possession of the present disclosure will recognize that any the server devices 202 and up to 206 may function in a similar manner while remaining within the scope of the present disclosure as well.

The method 400 then proceeds to block 404 where the policy engine receives one or more policies and configures a data mover device for application checkpoint and recovery operations. In an embodiment, at block 404, the policy engine 500 may receive one or more application checkpoint policies and/or one or more application recovery policies, and may operate to configure the data mover device 308 for application checkpoint and recovery operations based on those one or more application checkpoint policies and/or one or more application recovery policies. For example, as illustrated in FIG. 5B, the application 502 may provide one or more policies 504 to the policy engine 500 at block 404. In a specific example, upon installation of the application 502 in the server device 204/300 (e.g., via an operating system provided by the server device 300), one or more application checkpoint policies and/or one or more application recovery policies (e.g., included in an application manifest that is provided as part of the application installation) may be transmitted to the policy engine 500. However, in other embodiments, a user of the server device 204/300 may provide the one or more application checkpoint policies and/or one or more application recovery policies (e.g., "checkpoint flags") to the policy engine 500 at block 404 (e.g., subsequent to the installation of the application 502 on the server device 204/300) while remaining within the scope of the present disclosure as well. Furthermore, while a few examples have been described, one of skill in the art in possession of the present disclosure will recognize that policies may be provided to the policy engine 500 in a variety of manners that will fall within the scope of the present disclosure as well.

Figure 5C:
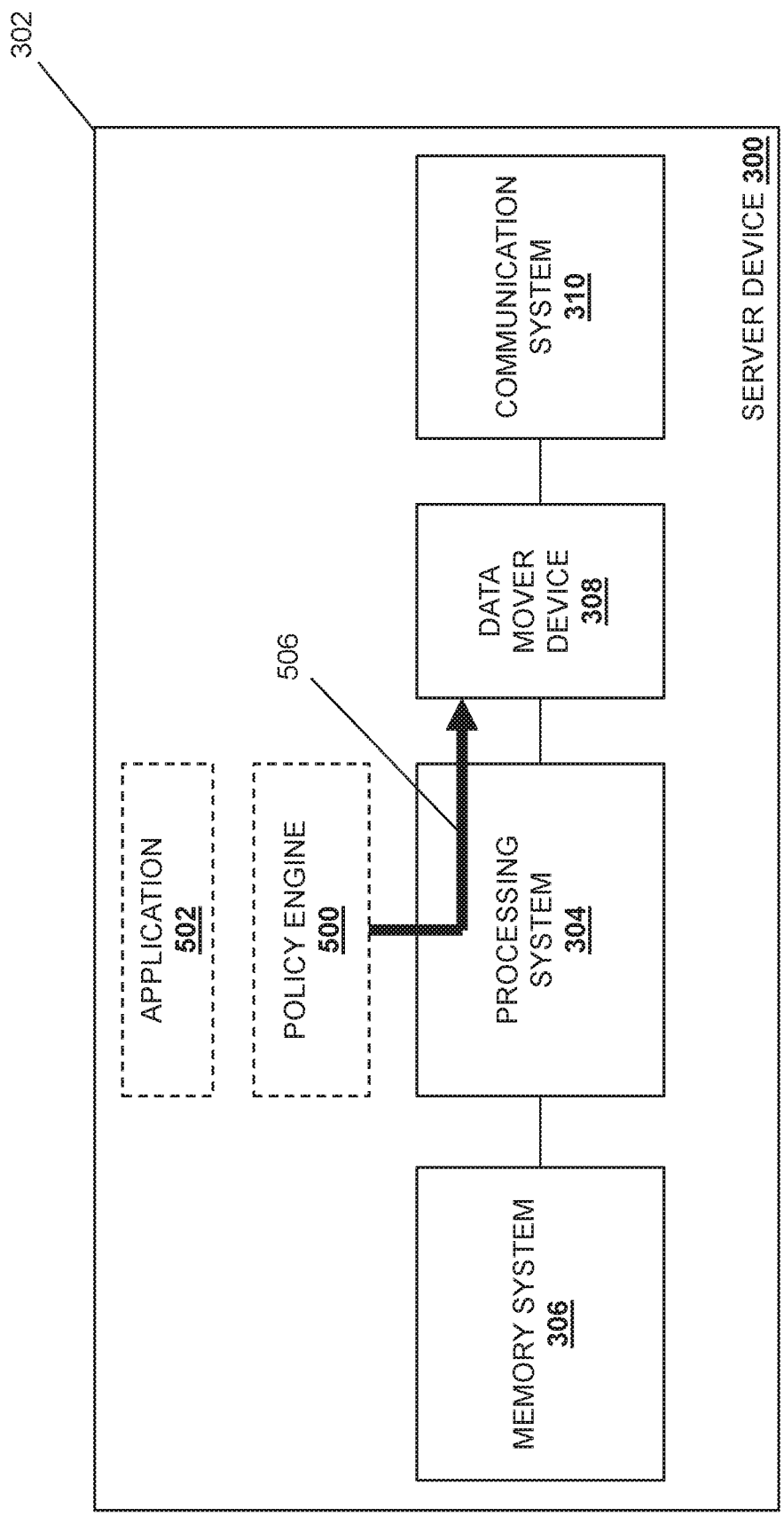
FIG. 5C is a schematic view illustrating an embodiment of the application checkpoint and recovery system in the server device of FIG. 3 operating during the method of FIG. 4.

As illustrated in FIG. 5C, at block 404 and in response to receiving the one or more application checkpoint policies and/or one or more application recovery policies, the policy engine 500 may operate to provide application checkpoint and/or application recovery configuration(s) 506 to the data mover device 308. For example, the data mover device 308 may be configurable to create any number of application checkpoint versions based on a configurable schedule that causes it to perform the application checkpoint operations discussed below at any of a variety of predetermined times, as well as may be configurable to perform any other application checkpoint operations and/or application recovery operations that are described below and/or that would be apparent to one of skill in the art in possession of the present disclosure. As such, the configuration of the data mover device 308 may include the policy engine 500 programming the data mover device 308 with the information needed to perform the application checkpoint operations discussed below, the application recovery operations discussed below, any other application checkpoint and/or recovery operations that would be apparent to one of skill in the art in possession of the present disclosure, and/or any other operations needed to provide the functionality described herein. As would be understood by one of skill in the art in possession of the present disclosure, configuration of the data mover device 308 to perform the application checkpoint operations discussed below may save time that would be required to program the data mover device 308 to do so during runtime, and may include configurations that provide for the copying of data to preconfigured target locations when performing checkpoint operations. Furthermore, in some embodiments, regions of memory for use by the data mover device 308 in storing and retrieving check-pointed data may be reserved (e.g., by kernel-level software operations) in order to further optimize the system.

Figure 5D:
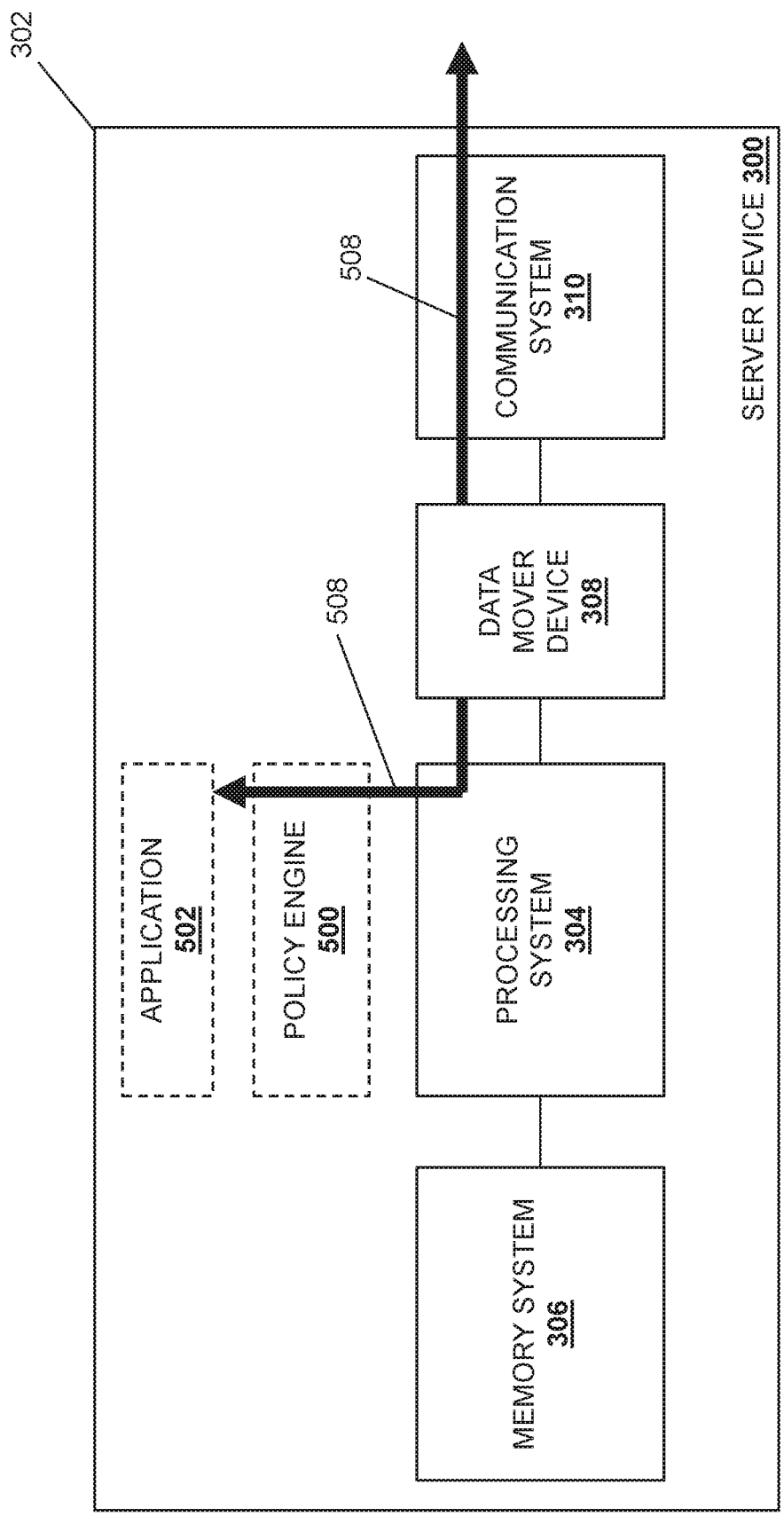
FIG. 5D is a schematic view illustrating an embodiment of the application checkpoint and recovery system in the server device of FIG. 3 operating during the method of FIG. 4.

The method 400 then proceeds to block 406 where the application operates using the memory fabric. As illustrated in FIGS. 5D and 5E, in an embodiment of block 406, the application 502 may operate to perform application operations that generate application memory fabric communications 508 that are generated and transmitted by the application 502 and via the data mover device 308 and the communication system 310 in the server device 204/300, through the network 208, and to the memory system 210 to provide and/or modify application information 510 that is stored in a memory location 210a in the memory system 210 and that is used to provide the application 502. For example, the application 502 and/or processing system 304 may include reference pointers to the memory location 210a in the memory system 210 that provides the memory fabric in the networked system 200, and thus the application memory fabric communications 508 generated by the application operations may cause the application information 510 (which is used, at least in part, to provide the application 502) to be stored, modified, and/or otherwise provided in the memory location 210a in the memory system 210.

The method 400 then proceeds to decision block 408 where the policy engine determines whether an application checkpoint operation should be performed for the application. In an embodiment, at decision block 408, the policy engine 500 may operate to monitor the application memory fabric communications 508 generated and transmitted by the application 502 in order to determine whether an application checkpoint operation should be performed for the application 502. For example, the policy engine 500 may operate to snoop the application memory fabric communications 508 generated and transmitted by the application 502, and analyze those application memory fabric communications 508 in order to determine whether an application checkpoint operation should be performed for the application 502. As will be appreciated by one of skill in the art in possession of the present disclosure, the application 502 may be configured to operate with application boundaries and/or may include other application execution points at which the processing system 304 will freeze, pause, and/or otherwise stop the operation of the application 502, and cause the application 502 to issue a system call (e.g., a synchronization call such as a an "msync( )" call) that is configured allow for application checkpoint operations to be performed. For example, the stopping of the application 502 may be performed at a predefined point in the operation of the application 502 that provides a "restartable" location for the application 502 that one of skill in the art in possession of the present disclosure would recognize may be selected by an application developer.) As such, in a specific example, the policy engine 500 may operate to snoop the application memory fabric communications 508 generated and transmitted by the application 502 in order to identify whether an application checkpoint system call (e.g., the synchronization call discussed above) has been issued by the application 502.

If, at decision block 408, the policy engine determines that an application checkpoint operation should not be performed for the application, the method 400 returns to block 406 where application continues to operate using the memory fabric. As such, in an embodiment of decision block 408, the policy engine 500 snoops application memory fabric communications 508 generated and transmitted by the application 502 and does not identify that an application checkpoint system call (e.g., the synchronization call discussed above) has been issued by the application 502, and the method 400 returns to block 406. As such, the method 400 may loop through blocks 406 and 408 such that the application 502 operates using the memory fabric by, for example, generating and transmitting the application memory fabric communications 508 that provide and/or modify the application information 510 stored in the memory location 210a in the memory system 210 as long as the policy engine 500 does not determine that an application checkpoint operation should be performed for the application 502 (e.g., based on an application checkpoint system call identified in snooped application memory fabric communications 508 generated and transmitted by the application 502).

Figure 5F:
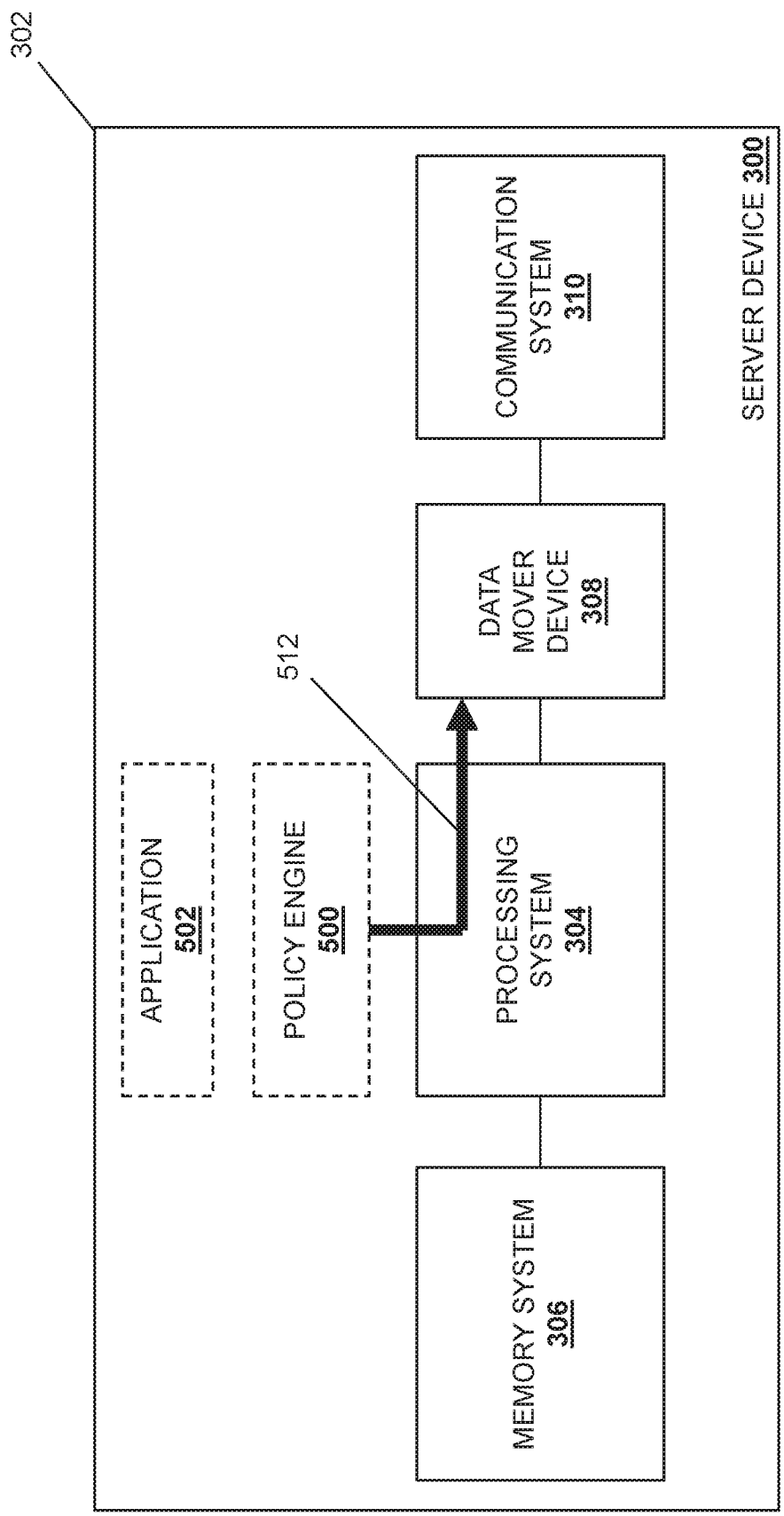
FIG. 5F is a schematic view illustrating an embodiment of the application checkpoint and recovery system in the server device of FIG. 3 operating during the method of FIG. 4.

If at decision block 406, the policy engine determines that an application checkpoint operation should be performed for the application, the method 400 proceeds to block 410 where the policy engine generates an application checkpoint instruction. As such, inn an embodiment of decision block 408, the policy engine 500 snoops application memory fabric communications 508 generated and transmitted by the application 502 and identifies that an application checkpoint system call (e.g., the synchronization call discussed above) has been issued by the application 502, and the method 400 proceeds to block 410. As illustrated in FIG. 5F, in an embodiment of block 410, the policy engine 500 may operate to generate an application checkpoint instruction 512 that is received by the data mover device 308. For example, the application checkpoint instruction 512 may include any instructions and/or information that will cause the data mover device 308 (by itself and/or in conjunction with the application checkpoint configuration provided for the data mover device 308 at block 404) to perform the application checkpoint operations discussed below.

Figure 5G:
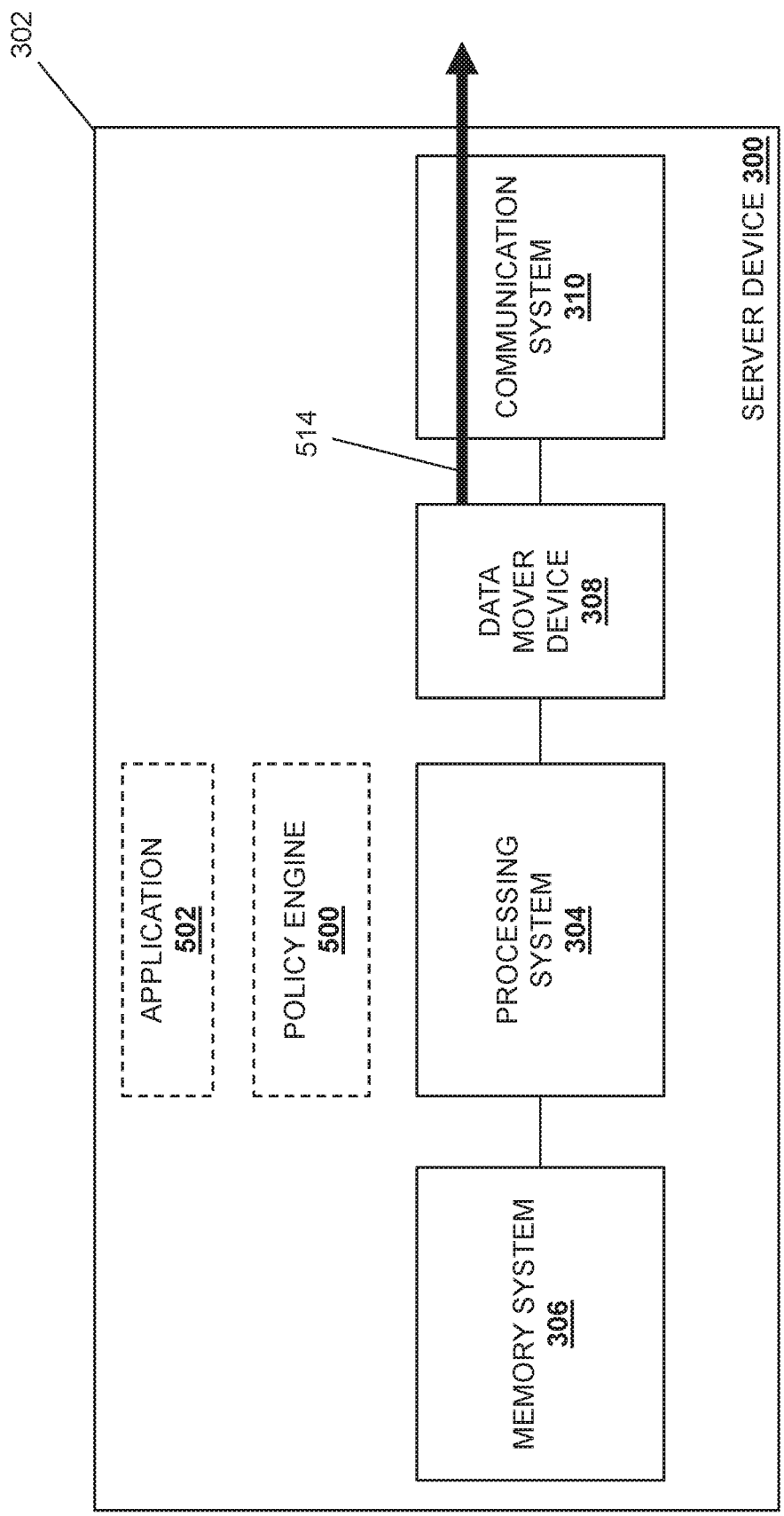
FIG. 5G is a schematic view illustrating an embodiment of the application checkpoint and recovery system in the server device of FIG. 3 operating during the method of FIG. 4.
Figure 5H:
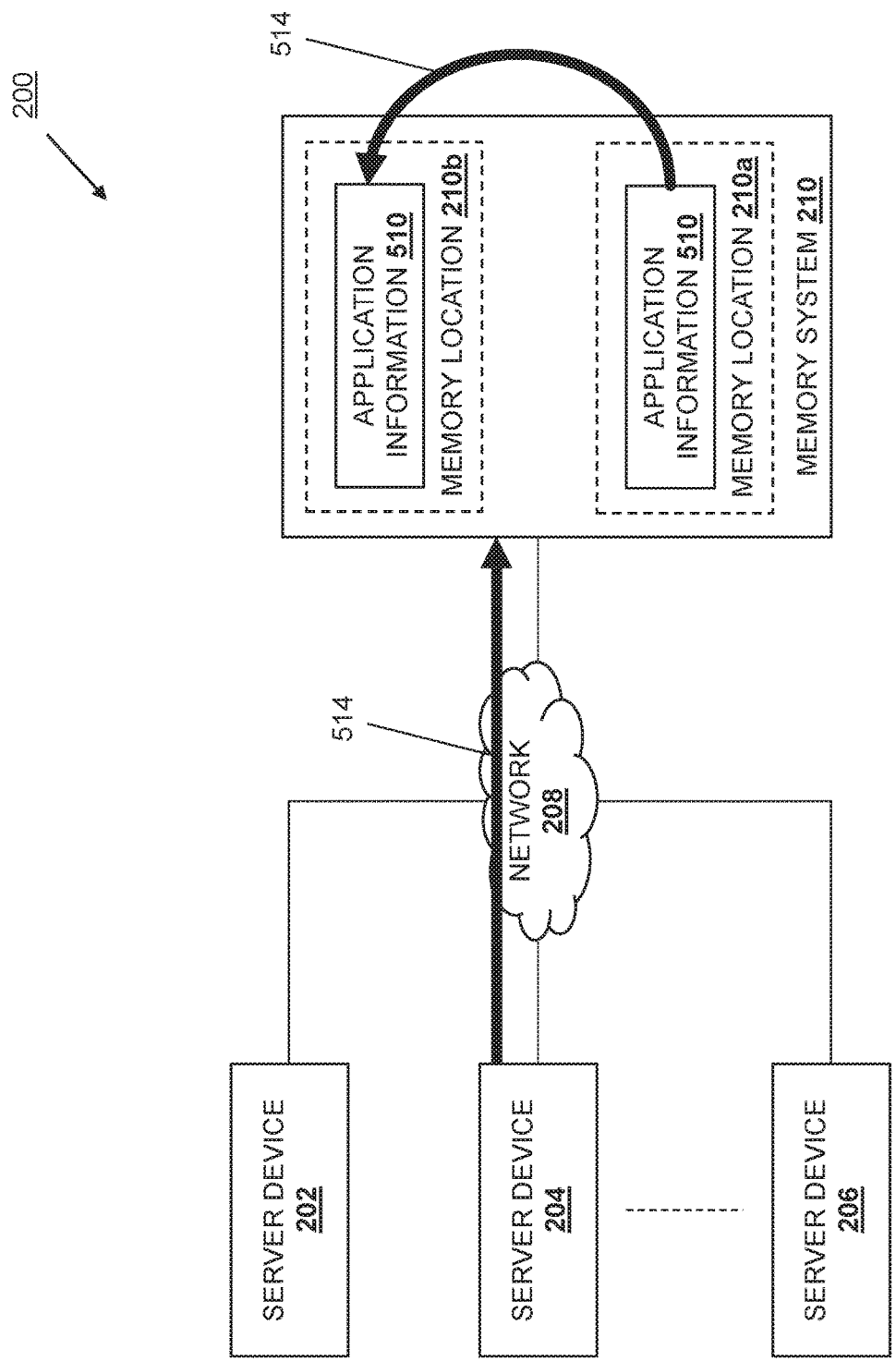
FIG. 5H is a schematic view illustrating an embodiment of the networked system of FIG. 2 operating during the method of FIG. 4.

The method 400 then proceeds to block 412 where the data mover device performs an application checkpoint operation using the memory fabric. As illustrated in FIGS. 5F, 5G, and 5H, in an embodiment of block 412, the data mover device 308 may receive the application checkpoint instruction 512 generated by the policy engine 500 and, in response, may perform application checkpoint operations 514 that may include capturing the application information 510 that is stored in the memory location 210a in the memory system 210 that provides the memory fabric, and then providing the captured application information 510 for storage in a memory location 210b in the memory system 210 that provides the memory fabric and that is different than the memory location 210a. As discussed above, the processing system 304 may freeze, pause, and/or otherwise stop the execution of the application 502 in order to allow for the performance of application checkpoint operations, and thus at block 412 the application information 510 may include application information needed to restart/recover the application 502 at the point at which it was frozen, paused, and/or otherwise had its execution stopped. As such, the capturing of application information may include the capture of processor process state information, application intermediate data, and in-flight Input/Output I/O data that may be stored in the memory fabric and/or other components in the networked system 200. FIG. 5H illustrates the effective result of the application checkpoint operations 514 performed by the data mover device 308 at block 414, with the application information 510 that is stored in the memory location 210a in the memory system 210 and that was being used to provide the application 502 before the application checkpoint operations were initialized, and a copy of that application information 510 (e.g., an application "snapshot") that has been stored in the memory location 210b in the memory system 210 and that may be used for application recovery operations (discussed below).

The application checkpoint operations 514 performed at block 412 may include the data mover device 308 providing a "shadow copy" of the application information 510 that was being utilized to provide the application 502 before that application 502 was stopped so that application checkpoint operations could be performed. As such, in some embodiments the application checkpoint operations 514 may include the data mover device 308 performing a full copy of the application information 510 that was being used to provide the application 502 (prior to it being stopped for the performance of application checkpoint operations) and that is stored in the memory location 210a in the memory system 210, and providing that full copy of the application information 510 in the memory location 210b in the memory system 210. For example, such full copy application checkpoint operations may be performed when no application checkpoint operations have yet been performed for the application 502 (and thus no application information is currently stored yet in the memory system 210 for performing application recovery operations), although performing a full copy application checkpoint operation after a prior application checkpoint operation has been performed for the application 502 (and thus a copy of the application information was taken at some point in the operation of the application 502 and is stored in a memory location other than the memory location 210a in the memory system 200) will fall within the scope of the present disclosure as well.

In other embodiments, the application checkpoint operations 514 may include the data mover device 308 performing a differential copy of the application information that is used to provide the application 502 and that is stored in the memory location 210a in the memory system 210, and providing that differential copy of the application information in the memory location 210b in the memory system 210. For example, such differential copy application checkpoint operations may be performed when a copy of the application information for the application 502 was taken at some point in the operation of the application 502 and stored in a memory location other in then the memory location 210a in the memory system 200, with that differential copy of the application information generated based on the differences in application information stored the memory location 210a and the application information stored in the memory location 210b. However, while two specific examples of copy operations performed during application checkpoint operations 514 have been described, one of skill in the art in possession of the present disclosure will recognize that a variety of copying/checkpointing techniques will fall within the scope of the present disclosure as well.

The method 400 then proceeds to decision block 414 where the policy engine determines whether an application recovery operation should be performed for the application. In an embodiment, at decision block 414, the policy engine 500 may operate to monitor the operation of the application 502, the application information stored in the memory location 210a in the memory system 210 that provides the memory fabric, and/or any other systems or subsystems associated with the operation of the application 502 in order to identify a failure associated with the application 502 that requires an application recovery operation to be performed for the application 502. For example, at decision block 414, the policy engine 500 may determine whether an application recovery operation should be performed for the application by determining whether the application has stopped working properly and/or as expected, whether the application information that is stored in the memory location 210a in the memory system 210 has been corrupted, and/or for any other application-associated failure that would be apparent to one of skill in the art in possession of the present disclosure.

If, at decision block 414, the policy engine determines that an application recovery operation should not be performed for the application, the method 400 returns to block 406 where application continues to operate using the memory fabric. In an embodiment, at decision block 414, the policy engine 500 may determine that the application 502 is operating properly and/or as expected, that the application information stored in the memory location 210a in the memory system 210 is available, uncorrupted, and/or sufficient for providing the application 502, and/or any other application-associated information that indicates that no failure is currently associated with the application 502, and the method 400 may return to block 406. As such, the method 400 may loop through blocks 406, 408, 410, 412, and 414 such that the application 502 operates using memory fabric to, for example, modify the application information stored in the memory location 210a in the memory system 210 as long as the policy engine 500 does not determine that an application checkpoint operation should be performed for the application 502, while the policy engine 500 causes the data mover device 308 to perform periodic application checkpoint operations that update the application information stored in the memory location 210b in the memory system 210.

Figure 6A:
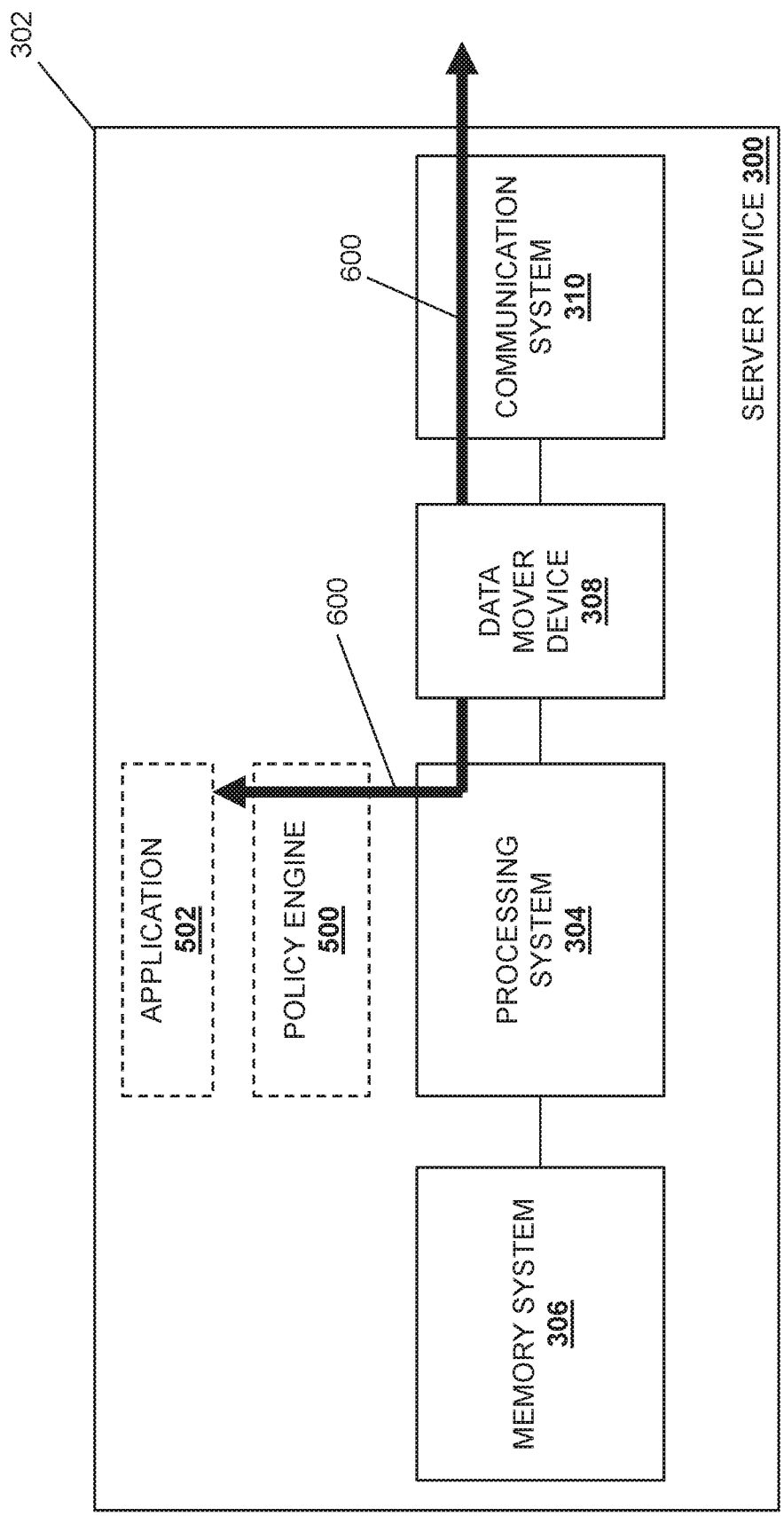
FIG. 6A is a schematic view illustrating an embodiment of the application checkpoint and recovery system in the server device of FIG. 3 operating during the method of FIG. 4.
Figure 6B:
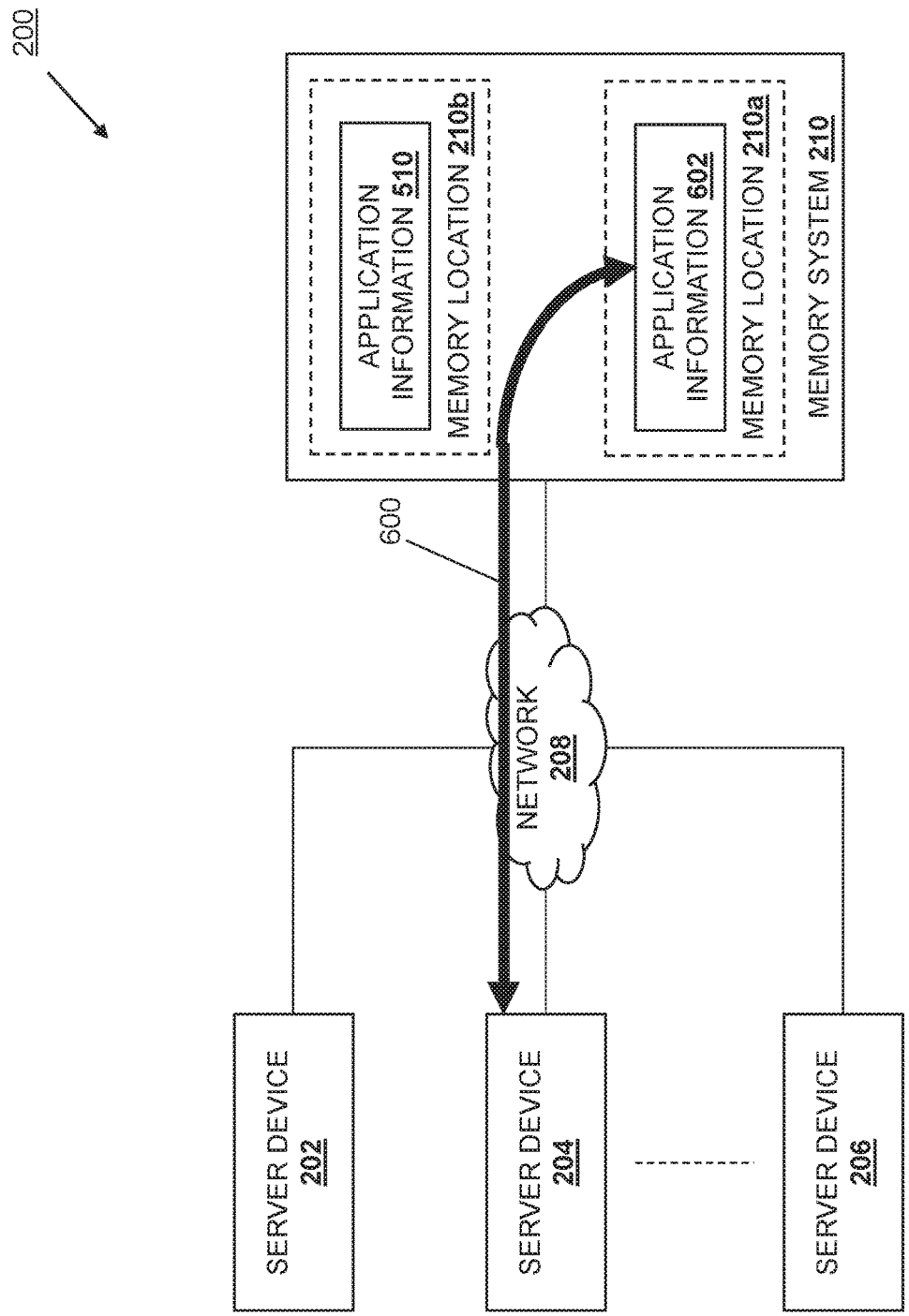
FIG. 6B is a schematic view illustrating an embodiment of the networked system of FIG. 2 operating during the method of FIG. 4.

With reference to FIGS. 6A and 6B, in an embodiment of block 406 that may be performed during some subsequent iteration of that portion of the method 400, the application 502 may operate to perform application operations that generate application memory fabric communications 600 that are transmitted by the application 502 and via the data mover device 308 and the communication system 310 in the server device 204/300, through the network 208, and to the memory system 210 to modify application information 510 that was stored in the memory location 210a such that application information 602 is stored in the memory location 210a and used to provide the application 502. As discussed above, the application 502 and/or processing system 304 may include reference pointers to the memory location 210a in the memory system 210 that provides the memory fabric in the networked system 200, and thus the application memory fabric communications 600 generated by the application operations may provide additional application information and/or modify the application information 510 in order to provide application information 602 in the memory location 210a in the memory system 210. As such, following any subsequent iteration of block 406 of the method 400, the application information 602 that is stored in the memory location 210a and used to provide the application 502 is different than the application information 510 that is stored in the memory location 210b and available for performing application recovery operations, discussed below.

Figure 6C:
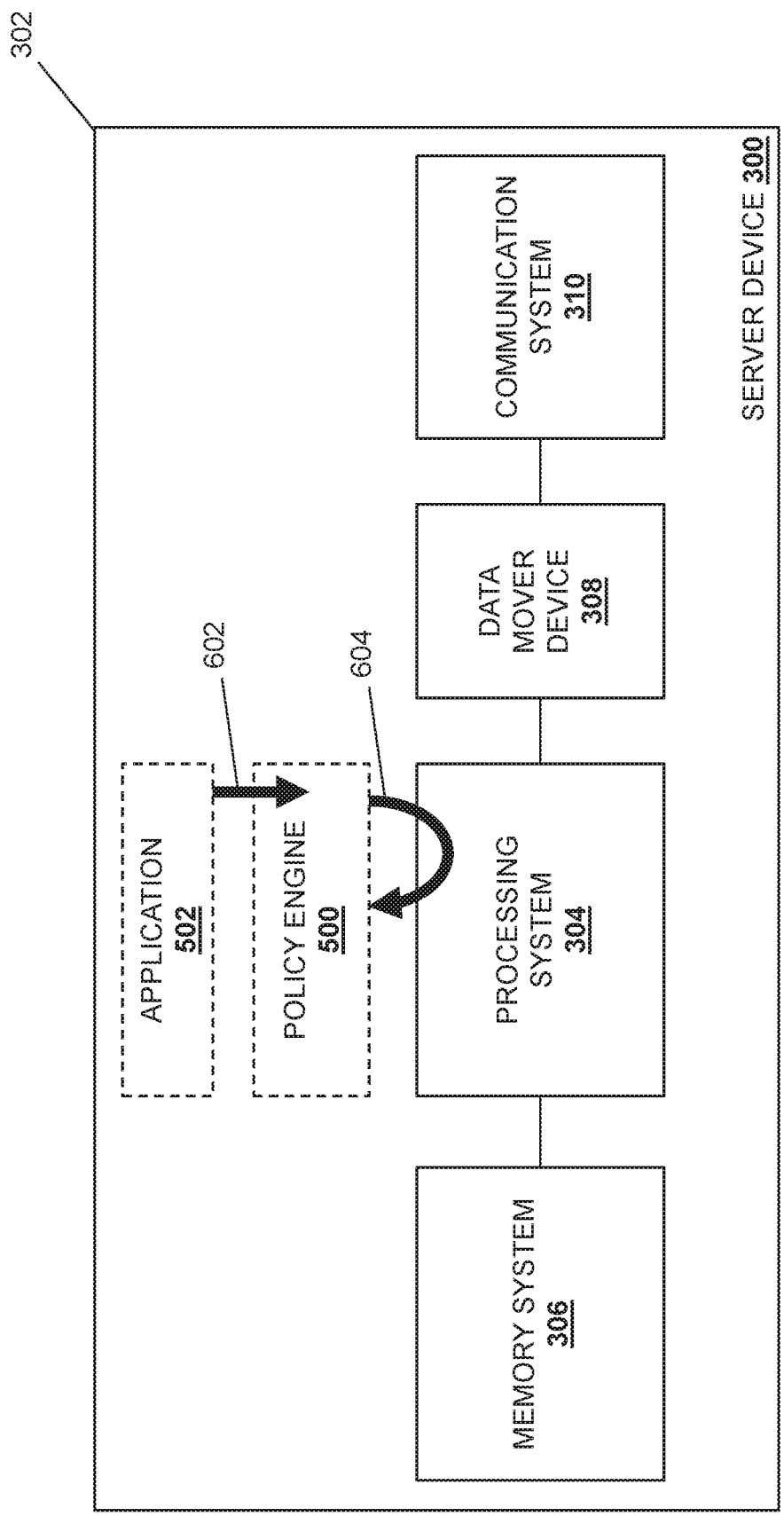
FIG. 6C is a schematic view illustrating an embodiment of the application checkpoint and recovery system in the server device of FIG. 3 operating during the method of FIG. 4.

If at decision block 414, the policy engine determines that an application recovery operation should be performed for the application, the method 400 proceeds to block 416 where the policy engine generates an application recovery instruction. In an embodiment, at decision block 414, the policy engine 500 identifies a failure associated with the application 502, and the method 400 proceeds to block 416. As illustrated in FIG. 6C, in an embodiment of decision block 414, the application 502 may generate and transmit an application memory fabric communication 602, which may result in an application-associated failure determination 604 by the policy engine 500 (e.g., a page fault, a memory fault, an active-copy-not-accessible fault, etc.) and, as illustrated in FIG. 6D, the policy engine 500 may operate to generate an application recovery instruction 606 that is received by the data mover device 308. For example, the application recovery instruction 606 may include any instructions and/or information that will cause the data mover device 308 (by itself and/or in conjunction with the application recovery configuration provided for the data mover device 308 at block 404) to perform the application recovery operations discussed below The method 400 then proceeds to block 418 where the data mover device performs an application recovery operation using the memory fabric. As illustrated in FIG. 6D, in an embodiment of block 416, the data mover device 308 may receive the application recovery instruction 606 generated by the policy engine 500 and, in response, may perform application checkpoint operations 608 that operate to move the application information 510 that is stored in the memory location 210b in the memory system 210 that provides the memory fabric to the memory location 210a in the memory system 210 that provides the memory fabric. As discussed above, the application information 510 stored in the memory location 210b in the memory system 210 may include application information needed to restart/recover the application 502 at the point at which it was frozen, paused, and/or otherwise had its execution stopped so that application checkpoint operations could be performed at block 412. FIG. 6E illustrates the effective result of the application recovery operations 608 performed by the data mover device 308 at block 418, with the application information 510 that is stored in the memory location 210b in the memory system 210a copied to the memory location 210a in the memory system 210 by the data mover device 308. Following block 418, the processing system 304 may operate to restart the application 502, at least in part, using the application information 510 that was copied to the memory location 210a in the memory system 210, thus restoring the application 502 to operate as it did immediately prior to the most recently performed application checkpoint operation by the data mover device 308. For example, as discussed above, the application 502 and/or processing system 304 may include pointers to the memory location 210a in the memory system 210, and thus the restarting of the application 502 will automatically provide for the use of the application information 510 that was copied to the memory location 210a in the memory system 210 at block 418, thus restoring the application 502 to operate as it did immediately prior to the most recent application checkpoint operation.

While the method 400 has been described as performing application recovery operations 608 that copy the application information 510 that is stored in the memory location 210b in the memory system 210 back to the memory location 210a in the memory system 210 in order to allow for the recovery of the application 502, in other embodiments, the application recovery operations may include changing pointer(s) provided for the application 502 and/or processing system 304 that point to the memory location 210a in the memory system 210 such that those pointers point to the memory location 210b in the memory system 210 to which the application information 510 was copied at block 412. As would be appreciated by one of skill in the art in possession of the present disclosure, the changing of such pointers and the restarting of the application 502 will automatically provide for the use of the application information 510 that was copied to the memory location 210b in the memory system 210, thus restoring the application 502 to operate as it did immediately prior to the most recent application checkpoint operation. In such embodiments, it may be desirable to immediately perform an application checkpoint operation for the application 502, as that application 502 is now being provided using the application information 510 in the memory location 210b (i.e., the application information provided via the most recent application checkpoint operation), which as discussed above can result in modifications to that application information 510 (and thus prevent future use of the application information in the memory location 210b for application recovery operations).

Thus, systems and methods have been described that provide a kernel subsystem that is configured to cause a data mover device to perform application checkpoint operations that include capturing a first version of application information that is stored in a first location in a memory fabric and that is used to provide an application, and provide the first version of the application information for storage in a second location in the memory fabric. As the application operates, it may modify the application information stored in the first location in the memory fabric in order to provide second application information that is stored in the first location in the memory fabric, and the kernel subsystem may cause the data mover device to perform application checkpoint operations at any time to ensure that a most current version of the application information (the first application information in this example) is stored in a second location in a memory fabric. In the event of a failure associated with the application (e.g., a failure of the application during its operation, a corruption of the application information currently stored in the first location in the memory fabric, etc.), the kernel subsystem may cause the data mover device to perform application recovery operations that include transferring the first application information from the second location in the memory fabric to the first location in the memory fabric so that it may be used to restart/recover the application at the point at which the first application information was captured. As such, an application checkpoint and recovery system is provide that offloads the application checkpoint and recovery operations from the processing system to a data mover device, while storing current application information used to provide the application, as well as a prior version of the application information that may be used to recover the application, in a memory fabric.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An application checkpoint and recovery system, comprising:
a processing system that is configured to:
provide, at least in part using application information stored in a first location in a memory fabric, an application that is configured to modify the application information stored in the first location of the memory fabric; and
provide a policy engine that is configured to:
determine that an application checkpoint operation should be performed for the application and, in response, generate an application checkpoint instruction; and
determine that an application recovery operation should be performed for the application and, in response, generate an application recovery instruction; and
a data mover device that is coupled to the processing system such that the data mover device performs operations without utilizing processing system cycles of the processing system, wherein the data mover device is configured to:
receive the application checkpoint instruction generated by the policy engine and, in response, perform an application checkpoint operation that includes:
capturing a first version of the application information that is stored in the first location in the memory fabric; and
providing the first version of the application information for storage in a second location in the memory fabric; and
receive, subsequent to the application modifying the first version of the application information stored in the first location in the memory fabric to provide a second version of the application information stored in the first location of the memory fabric, the application recovery instruction generated by the policy engine and, in response, perform an application recovery operation that includes:
transferring the first version of the application information from the second location in the memory fabric to the first location in the memory fabric such that the first version of the application information is available for use by the processing system in providing the application.

2. The system of claim 1, wherein the processing system is configured to:
determine that the application checkpoint operation should be performed for the application and, in response, stop operation of the application.

3. The system of claim 1, wherein the policy engine is configured to:
receive an application checkpoint policy for the application and, in response, use the application checkpoint policy to configure the data mover device to perform the application checkpoint operation; and
receive an application recovery policy for the application and, in response, use the application recovery policy to configure the data mover device to perform the application recovery operation.

4. The system of claim 1, wherein the policy engine is configured to:
snoop communications transmitted by the application and, in response, determine that the application checkpoint operation should be performed for the application.

5. The system of claim 1, wherein the policy engine is configured to:
identify a failure associated with the application and, in response, determine that the application recovery operation should be performed for the application.

6. The system of claim 1, wherein the policy engine is included in a kernel subsystem provided by the processing system.

7. An Information Handling System (IHS), comprising:
a data mover processing system; and
a data mover memory system that is coupled to the data mover processing system and that includes instructions that, when executed by the data mover processing system, cause the data mover processing system to provide a data mover engine that is configured to:
receive an application checkpoint instruction generated by a policy engine and, in response, perform an application checkpoint operation that includes:
capturing a first version of application information that is used by an application processing system to provide an application and that is stored in a first location in a memory fabric; and
providing the first version of the application information for storage in a second location in the memory fabric; and
receive, subsequent to the application modifying the first version of the application information stored in the first location in the memory fabric to provide a second version of the application information stored in the first location of the memory fabric, an application recovery instruction generated by the policy engine and, in response, perform an application recovery operation that includes:
transferring the first version of the application information from the second location in the memory fabric to the first location in the memory fabric such that the first version of the application information is available for use by the application processing system in providing the application, wherein the application recovery operation performed by the data mover processing system is performed without utilizing application processing system cycles of the application processing system.

8. The IHS of claim 7, further comprising:
the application processing system that is coupled to the data mover processing system and that is configured to:
determine that an application checkpoint operation should be performed for the application and, in response, stop operation of the application and generate the application checkpoint instruction.

9. The IHS of claim 7, further comprising:
the policy engine that is coupled to the data mover processing system and that is configured to:
receive an application checkpoint policy for the application and, in response, use the application checkpoint policy to configure the data mover engine to perform the application checkpoint operation; and
receive an application recovery policy for the application and, in response, use the application recovery policy to configure the data mover engine to perform the application recovery operation.

10. The IHS of claim 7, further comprising:
the policy engine that is coupled to the data mover processing system and that is configured to:
snoop communications transmitted by the application and, in response, determine that an application checkpoint operation should be performed for the application and generate the application checkpoint instruction.

11. The IHS of claim 7, further comprising:
the policy engine that is coupled to the data mover processing system and that is configured to:
identify a failure associated with the application and, in response, determine that the application recovery operation should be performed for the application and generate the application recovery instruction.

12. The IHS of claim 7, wherein the policy engine is included in a kernel subsystem provided by the application processing system.

13. The IHS of claim 7, wherein the application information includes:
application processing system process state information associated with the application;
application data associated with the application; and
in-flight Input/Output (I/O) data associated with the application.

14. A method for checkpointing and recovering applications, comprising:
receiving, by a data mover device, an application checkpoint instruction generated by a policy engine and, in response, performing an application checkpoint operation that includes:
capturing a first version of application information that is used by a processing system to provide an application and that is stored in a first location in a memory fabric; and
providing the first version of the application information for storage in a second location in the memory fabric; and
receiving, by the data mover device subsequent to the application modifying the first version of the application information stored in the first location in the memory fabric to provide a second version of the application information stored in the first location of the memory fabric, an application recovery instruction generated by the policy engine and, in response, perform an application recovery operation that includes:
transferring the first version of the application information from the second location in the memory fabric to the first location in the memory fabric such that the first version of the application information is available for use by the processing system in providing the application, wherein the application recovery operation performed by the data mover device is performed without utilizing processing system cycles of the processing system.

15. The method of claim 14, further comprising:
determining, by the processing system, that an application checkpoint operation should be performed for the application and, in response, stopping operation of the application and generating the application checkpoint instruction.

16. The method of claim 14, further comprising:
receiving, by the policy engine, an application checkpoint policy for the application and, in response, using the application checkpoint policy to configure the data mover device to perform the application checkpoint operation; and
receiving an application recovery policy for the application and, in response, using the application recovery policy to configure the data mover device to perform the application recovery operation.

17. The method of claim 14, further comprising:
snooping, by the policy engine, communications transmitted by the application and, in response, determining that an application checkpoint operation should be performed for the application and generating the application checkpoint instruction.

18. The method of claim 14, further comprising:
identifying, by the policy engine, a failure associated with the application and, in response, determining that the application recovery operation should be performed for the application and generating the application recovery instruction.

19. The method of claim 14, wherein the policy engine is included in a kernel subsystem provided by the processing system.

20. The method of claim 14, wherein the application information includes:
processing system process state information associated with the application;
application data associated with the application; and
in-flight Input/Output (I/O) data associated with the application.

* * * * *